United States Patent Office 3,214,444
Patented Oct. 26, 1965

3,214,444
PROCESS FOR THE PURIFICATION OF HALO-GEN-CONTAINING ANHYDRIDES AND DERIV-ATIVES THEREOF
William F. Zimmer, Jr., Grand Island, Russel A. Bowman, Clarence, and Alvin F. Shepard, Grand Island, N.Y., assignors to Hooker Chemical Corporation, Niagara Falls, N.Y., a corporation of New York
No Drawing. Filed May 9, 1962, Ser. No. 193,607
14 Claims. (Cl. 260—346.3)

This is a continuation-in-part of application Serial No. 799,125, filed March 13, 1959 now abandoned.

This invention relates to the purification of halogen-containing anhydrides and derivatives thereof. More particularly, this invention resides in a new process for the purification of halogen-containing anhydrides and derivatives thereof, said anhydrides comprising the Diels-Alder adducts of hexahalocyclopentadiene as the diene and maleic anhydride as the dienophile. The preferred adduct of the present invention is chlorendic anhydride, the Diels-Alder adduct of hexachlorocyclopentadiene and maleic anhydride which is 1,4,5,6,7,7-hexachlorobicyclo-(2.2.1)-5-heptene-2,3-dicarboxylic anhydride.

Chlorendic anhydride prepared by the methods described in the prior art is contaminated by chlorocarbon residues and impurities arising from incomplete reaction or from impurities in the reactants. Reaction of molar amounts of hexachlorocyclopentadiene and maleic anhydride, although more than 50 percent reacted at 150 degrees centigrade in the first hour of reaction, is incomplete even after seven or eight hours at the same temperature. It is very difficult, if not impossible, to carry the reaction to complete consumption of chlorocarbon, even if very pure hexachlorocyclopentadiene is used. Moreover, ordinary commercial hexachlorocyclopentadiene contains about three percent impurities such as hexachlorobutadiene and octachlorocyclopentene, neither one of which will adduct with maleic anhydride.

These impurities, if not removed, can give rise to very objectionable odors and vapors which may attack and irritate the eyes and sensitive membranes of the respiratory tract of workers handling this material. These chlorocarbon impurities also act as skin irritants, giving rise to a type of dermatitis. If such unreacted chlorocarbon residues remain in the product, they can give rise to objectionable and ruinous discolorations and other decomposition products on subsequent reaction such as esterification with mono-, di- or polyhydric alcohols. Moreover, such chlorocarbon may cause expensive corrosion damage to metal processing equipment if allowed to remain during subsequent reaction of the product.

The prior art accomplished removal of these contaminants by extensive recrystallization of the anhydride as such or conversion to the acid and recrystallization as the free acid. These methods are time consuming and expensive and not economically adapted to a commercial operation.

It is, therefore, an object of the present invention to provide a method for the purification of halogen-containing anhydrides and derivatives thereof, which is inexpensive, simple, and direct, and is readily adaptable to large scale commercial operations. Other objects will become apparent to those skilled in the art on consideration of the complete specification.

We have found a new and useful method for the purification of Diels-Alder adducts and derivatives thereof of hexahalocyclopentadiene as the diene and maleic anhydride as the dienophile wherein the halogen in the diene can be chlorine, bromine, fluorine, iodine, and mixtures thereof. It has been found that well-purified products may be obtained by removing the halocarbon impurities by an azeotropic distillation comprising adding to the mixture a material which will form a constant minimum boiling mxiture with the halocarbon impurities and distilling off said constant boiling mixture at a temperature low enough to substantially prevent unwanted by-product from forming in the product.

The process of the present invention possesses many advantages. It lends itself admirably to production on a commercial scale. It is far less expensive than the procedures of the prior art, less time consuming, and more versatile in its application.

The diene and dienophile are reacted in any convenient manner to yield the adduct in a crude form. For example, the reaction may be carried out in the presence of a solvent, such as dichlorobenzene, or in the absence of solvent utilizing the azeotroping agent as a melting point depressant. The latter method is obviously preferred since fewer materials are utilized. This crude form then may be processed according to the present invention by one of two routes, both of which depend upon azeotropic removal of chlorocarbon impurities. The choice of route will depend on the product desired, degree of purification required, and equipment available for the processing. In the first of these two routes the adduct is purified of chlorocarbon residues while its anhydride character is mainly preserved; in the second route, purification of the product is effected after the adduct is converted into a partial ester.

In accordance with the present invention, it has been found that Diels-Alder adducts of hexahalocyclopentadiene and maleic anhydride may be purified of halocarbon impurities (such as hexahalocyclopentadiene and its normal impurities) by contacting the crude anhydride adduct with a substance which is capable of formnig constant minimum boiling azeotropes with the halocarbon impurities and distilling off these azeotropes until the impurities are exhaused from the system. An example of a substance functioning in this way is maleic anhydride. Maleic anhydride (boiling point 115 degrees centigrade at 50 millimeters) and hexachlorocyclopentadiene (boiling point 143 degrees centigrate at 50 millimeters) form an azeotrope boiling at 110 degrees centigrade at 50 millimeters which contains about equal parts by weight of chlorocarbon and maleic anhydride. Similarly, maleic anhydride forms minimum boiling azeotropes with hexachlorobutadiene and octachlorocyclopentene. The use of maleic anhydride as azeotroping agent lends itself well to the large scale purification of chlorendic anhydride, since a two-phase distillate is obtained. The upper maleic anhydride rich layer can be returned to the reaction mass for re-use. Furthermore, the maleic anhydride acts as a melting point depressant and can thus keep the mass liquid or stirrable at the operating temperature. In this fashion, it is possible to prepare purified chlorendic anhydride containing no more than a small fraction of a percent of chlorocarbon impurities analyzed as hexachlorocyclopentadiene by spectrophotometric analysis. While maleic anhydride is the preferred azeotroping agent when chlorendic anhydride is the desired product, other agents that can be used are the aliphatic monohydric, dihydric and polyhydric alcohols and water. The dihydric and polyhydric alcohols are preferred over the monohydric alcohols because the latter compounds generally have lower boiling points and large amounts of low boiling compounds are required to provide minimum boiling mixtures with the comparatively high boiling halocarbon impurities. Typical monohydric alcohols include the following: methyl alcohol, ethyl alcohol; allyl alcohol; methallyl alcohol; n-propyl alcohol; isopropyl alcohol; n-butyl alcohol; secondary butyl alcohol n-amyl alcohol; isoamyl alcohol; and the like. Typical dihydric alcohols include: ethylene glycol; diethylene glycol; propylene glycol; dipropylene glycol; 1,4-butanediol; 1,4-butenediol; 1,4-butynediol; 1,3-butanediol; 1,2-butanediol; 1,2-pentanediol; 1,3-pentadediol 1,4-pentanediol; 1,5-pentanediol; 1,6-hexanediol; neopentyl glycol and the like. Typical polyhydric alcohols include: glycerol; hexanetriol; butanetriol; trimethylol propane; trimethylol ethane; pentaerythritol; and the like. When pentaerythritol is used, it may contain some di- and tri-pentaerythritol. When the alcohols are employed as azeotroping agents a small amount of partial ester is formed, but in most of the end uses of the anhydride, this is not an objectionable contaminant. Water is the least desired azeotroping agent when chlorendic anhydride is the desired product, because at least a portion of the anhydride is converted to the acid which would require the additional step of reconversion to the anhydride. Mixtures of the foregoing azeotroping agents can also be employed.

Alternatively, the crude chlorendic anhydride may be converted in whole or in part into a partial ester before purification is effected. For example, the anhydride can be reacted with an amount of any of the foregoing monohydric, dihydric, polyhydric alcohols or mixtures thereof sufficient to convert the anhydride in whole or in part into a half ester which may then be purified by azeotropic distillation to remove unwanted chlorocarbon impurities. The partial ester in this case serves as a melting point depressant and allows a stirrable system to be preserved by preventing at least partly the mass from solidifying. The resulting liquid or slurry may then be azeotropically purified by the addition and distillation of an azeotroping agent such as maleic anhydride, water, and any of the foregoing monohydric, dihydric and polyhydric alcohols, and mixtures thereof. This alternative route may be modified to allow azeotropic purification to occur concurrently with esterification of the remaining carboxyl groups such that the ultimate product obtained is a di- or polyester of the original anhydride.

The amount of azeotroping agent used in any case will vary depending upon the material employed, the amount of impurities, the nature of the impurities, and the effect desired. Generally, however, the amount employed will vary from a few weight percent to 100 percent or more. The temperature of the distillation will vary with the materials used, the degree of purification desired, the pressure chosen, and so on. Generally, however, the temperature should be below 170 degrees centigrade and preferably below 140 degrees centigrade. During distillation a vacuum is preferably applied so that the distillation can be conducted at a lower temperature that would otherwise obtain, thus removing the impurities before they can be converted into undesirable by-products, i.e., this retards or prevents discoloration due to by-product formation. The pressure may thus be varied from about 1000 millimeters down to one millimeter or even below, usually below about 200 millimeters. The product thus obtained is of high purity and of light color. The preferred additive for the azeotropic purification of chlorendic anhydride is maleic anhydride, as this allows the distillation to proceed without the addition of another raw material. When the product is to be further reacted with a glycol or polyol such as ethylene glycol, propylene glycol, glycerol, trimethylol propane, and so on, the preferred azeotroping agent is that glycol or polyol.

The purified product thus obtained may then be esterified to form a high quality ester or polyester by addition of materials heretofore delineated. This provides a simplified procedure for preparing flame-retardant highly heat-resistant esters and polyesters from a purified halogen-containing anhydride suitable for molding compounds, laminates, pre-pregs, protective coatings, bonding agents, and impregnating agents and suitable for further reaction with vinyl monomers, epoxides, isocyanates, and the like.

In addition, the purified anhydrides of the present invention find use as hardeners for epoxy resins.

Azeotropes formed between the residual chlorocarbons and the various azeotroping agents are typified by the following table:

| Material | Boiling point of material at 50 mm. | Boiling point of 50/50 mix with hexachlorocyclopentadiene at 50 mm. |
| --- | --- | --- |
| Hexachlorocyclopentadiene | 143 | |
| Ethylene glycol | 124 | 116 |
| Diethylene glycol | 161 | 133 |
| Propylene glycol | 117 | 110 |
| Glycerol | 202 | 140 |
| Maleic anhydride | 115 | 110 |

The above table is included for illustrative purposes and is not intended to precisely define the nature of these azeotropes other than to indicate that minimum boiling mixtures do, in fact, exist between these materials and hexachlorocyclopentadiene. Similarly, azeotropes between these same materials and other chlorocarbon such as octochlorocyclopentene and hexachlorobutadiene may be shown to exist.

The following examples will serve to illustrate the process of the present invention and the improvements resulting therefrom.

*Example 1.—Simultaneous adduction and maleic azeotropic purification of anhydride*

Maleic anhydride (0.60 mole) and commercial hexachlorocyclopentadine (0.63 mole) were reacted together at 150° centigrade in a stainless steel resin kettle. After four hours reaction time an azeotropic distillation at an approximate one plate efficiency was carried out at the water pump vacuum of about 20 millimeters to 40 millimeters of mercury. During this distillation 0.41 mole additional maleic anhydride was added as requird to maintain a stirrable liquid system. As the maleic anhydride-chlorocarbon azeotropic mixture distilled from the reactor, the chlorocarbon content of the reactor contents was followed by means of precipitometric analysis from methanol solution with aqueous base. The disappearance of the last measurable amount of chlorocarbon marked the completion of purification. There was obtained 230 pounds of purified adduct consisting of 5.0 weight percent maleic anhydride and 95 weight percent chlorendic anhydride.

This purified adduct was found to be suitable for the preparation of polyester resins and other products. As an example, 318 grams of this product, 117 grams additional maleic anhydride, and 167 grams propylene glycol were combined in a small resin kettle which was then flushed with carbon dioxide. The kettle was heated to 150° centigrade for one-half hour to effect solution. The esterfication was conducted to two-thirds completion as measured by water evolution as 110 millimeters at 180° centigrade, after which the pressure was reduced to 5 millimeters and the resinification completed in two more hours. There was obtained a brittle resin suitable for molding compounds or for high viscosity laminating resins, Gardner color seven, carboxyl value 0.57 meq./gram, hydroxyl value 0.45 meq./gram. The resin was completely free of unpleasant odor, and as a cross-linked styrenated resin was found to have weather resistance, stability to light, and fire resistance equal to that of an equivalent formulation prepared with recrystallized chlorendic anhydride.

*Example 2.—Balanced adduct-maleic azeotrope for anhydride purification*

Chlorendic anhydride was prepared by reacting together one mole of commercial hexachlorocyclopentadiene and one mole commercial maleic anhydride for a period of five hours at 140° centigrade plus or minus 5° centigrade. At this time the reaction was about 95 percent complete and the mixture formed a slurry which became difficult to stir because of the precipitation of chlorendic anhydride. To this slurry was added one mole of maleic anhydride, whereupon the precipitate redissolved, and a clear solution was obtained. This crude product mixture was purified through distillation at about 150° centigrade and 20 millimeters to 40 millimeters wherein the additional maleic anhydride was distilled along with unreacted chlorocarbons which azeotrope with maleic anhydride, i.e., hexachlorocyclopentadiene, hexachlorobutadiene, octachlorocyclopentene, etc. The distillation was continued until the reactor contents became too thick and viscous to stir well at 150° centigrade. Dilution of the distillate with water allowed the recovery of about 6 grams of mixed chlorocarbons. (If it is desired, the distillate may be decanted and the maleic anhydride portion returned to the process cycle in a continuous process, since maleic anhydride and the chlorocarbons form a two-phase liquid solid system of which the heavier phase is the chlorocarbon layer.) The product remaining in the reactor may be shown by spectrophotometric analysis or by precipitometric analysis to contain less than 0.1 percent chlorocarbon calculated as hexachlorocyclopentadiene, and it consists of approximately 97 percent chlorendic anhydride along with about 3 percent residual maleic anhydride. This product is of high purity and is a nearly colorless solid. It is suitable for the preparation of esters and polyesters, without giving rise to objectionable discolorations, odors, and skin irritations characteristic of chlorinated hydrocarbons and without causing corrosion of processing equipment.

If desired, the product may be further converted into virtually 100 percent chlorendic anhydride by continuing the vaporization of the maleic anhydride (and any remaining chlorocarbons) from the product as a dispersed solid in some process such as vacuum drying. By this means there may be obtained a high purity, white, solid, powdery chlorendic anhydride, melting point 231° to 235° centigrade, neutral equivalent 183.

*Example 3.—Excess maleic adduct—maleic azeotrope for anhydride purification*

Maleic anhydride (1.1 moles) and hexachlorocyclopentadiene (1.0 mole of freshly distilled material) were reacted together in a glass resin kettle at 150° centigrade for seven to eight hours until spectrophotometric analysis for the chlorocarbon indicates a constant value of about 0.2 percent. Then azeotropic distillation of maleic anhydride and unreacted chlorocarbon was carried out under reduced pressure of about 170 millimeters down to 40 millimeters as required. Additional maleic anhydride was added as required to maintain a liquid, stirrable mass. The end point of this distillation may be taken as that point wherein a sample of the distillate when dissolved in water forms a clear solution. Cloudiness of an aqueous solution of the distillate indicates the presence of unreacted chlorocarbon. Continued distillation, carried out until stirring becomes difficult at 150° centigrade, leads to a product containing 97 percent to 98 percent chlorendic anhydride and 2 percent to 3 percent maleic anhydride. This product is suitable for the preparation of esters, and polyesters, as in the previous examples.

*Example 4.—Glycol as melting depressant—maleic and glycol azeotropic purification*

Commercial hexachlorocyclopentadiene (0.611 pound moles) was charged into a strainless steel resin kettle and heated to 150° centrigrade. To this was added at a variable rate, to keep temperatures below 155° centigrade, 0.672 mole maleic anhydride. The reaction mixture was then cooked at 150° centigrade until spectrophotometric analysis of the mass indicated a constant 0.6 percent chlorocarbon content. At this time 3.8 pounds of ethylene glycol (0.061 mole) was added. The mixture formed a stirrable liquid while stirring was maintained for ten minutes. Then a pressure of 12 millimeters mercury was applied and an azeotropic mixture containing chlorocarbon was distilled off, amounting to about 3 pounds. Then 1.14 pounds (0.184 mole) ethylene glycol was added and the distillation continued until little or no distillate was obtained. There was obtained a total of 5.33 pounds of distillate consisting approximately of 52 percent maleic anhydride, 11 percent ethylene glycol, and 38 percent chlorocarbon. The product consisted of approximately 98 percent chlorendic anhydride with not more than 2 percent combined of ethylene glycol and maleic anhydride and not more than a trace of chlorocarbon impurity. This product is suitable for subsequent conversion into esters and polyesters without the objectionable side effects caused by chlorocarbon contamination.

*Example 5.—Diallyl chlorendate preparation—maleic azeotrope of partial ester*

An adduct was prepared in a stainless steel resin kettle by reacting 0.6 mole hexachlorocyclopentadiene with 0.66 mole maleic anhydride at 150° centigrade until the adduct analyzed spectrophotometrically for a constant 0.45 weight percent chlorocarbon content (as hexachlorocyclopentadiene). This reaction required about 6.5 hours after addition of all maleic anhydride.

The azeotropic purification of the above adduct was carried out as follows: The adduct, 688 grams (2 moles of anhydride) and 104.4 grams (1.8 moles) allyl alcohol were mutually dissolved by heating until a clear solution was effected. Then azeotropic chlorocarbon removal was carried out by evacuating the system to 2 millimeters to 5 millimeters of mercury at a temperature up to 170° centigrade. The mixed maleic anhydride- chlorocarbon-allyl alcohol distillate was diluted with water, from which 8 grams of mixed chlorocarbons were recovered.

The purified partial ester was esterified by means of azeotropic water removal. The product mass was treated with 30 cubic centimeters benzene and 2.4 moles (151.7 grams) allyl alcohol. Azeotropic distillation was conducted by means of phase separating distilling head atop a one-foot long, one-inch diameter glass Raschig ring packed column. The pot was heated such that at 160° centigrade to 170° centigrade adequate reflux was obtained. After 22 hours esterification water layer had stopped forming, so a vacuum topping of the product was carried out to a pressure of 5 millimeters mercury at a pot temperature up to 180° centigrade. There was obtained a 93 percent yield (819 grams) of product, Gardner color six to seven, acid number twelve, and consisting largely of diallyl chloroendate with a small amount of polymerized diallyl chloroendate. This diallyl ester product was found to be a somewhat viscous liquid, having a pleasant non-irritating odor and having no effect as a skin irritant. It contained no measurable amount of hexachlorocyclopentadiene. It was found suitable for polymerization with polyester resins; its behavior in general was found equivalent to diallyl chlorendate prepared from recrystallized chlorendic acid.

*Example 6.—Polyester preparation—ethylene glycol azeotrope of partial ester*

An adduct was made from 6.6 moles freshly distilled hexachlorocyclopentadiene and 6.0 moles maleic anhydride by reaction for seven hours at 145° centigrade to 150° centigrade in a three-necked, glass balloon flask fitted as a resin kettle. Then 1200 grams of ethylene glycol was added to the mixture which, after a clear syrup had formed, was cooled to below 100° centigrade. The flask was fitted with a one-foot long, one-inch diameter, glass Raschig ring packed dephlegmator. An azeotropic distillation was carried out at a pot temperature of about 100° centigrade at 5 millimeters of mercury over the course of several hours. When no more chlorocarbon layer was visible in the distillate, the total distillate was decanted to yield 164 grams of chlorocarbon (excess of hexachlorocyclopentadiene used was 162 grams). Then more glycol was added and the distillation continued until the odor of chlorocarbon disappeared from the distillate. At this point 1126 grams of glycol had been distilled, leaving a glycol chlorendate solution containing the equivalent of 6.0 moles of chlorendic acid and 11.4 moles of ethylene glycol. The color this pre-resin was less than one Gardner.

One-half of this product (1466 grams) was used to prepare a resin by combining with it 213 grams of fumaric acid, 52.8 grams diethylene glycol, 197 grams adipic acid, and 14 grams additional ethylene glycol. These ingredients were combined in a one-liter resin kettle and esterified at 165° centigrade and 200 millimeters of mercury for 4.5 hours, then 100 millimeters of mercury for one hour and finally at 5 millimeters of mercury for seven hours. The resin was treated with 0.176 gram of p-toluhydroquinone two hours before completion. The finished resin was dumped into trays and cooled under a carbon dioxide blanket. A yield of 1464 grams of resin was obtained, acid number 18.7, hydroxyl value 0.228 meq./gram, and color of four to five Gardner scale.

A sample of 1000 grams of the above solid resin was styrenated with 400 grams styrene to yield a styrenated laminating resin of three Gardner color indistinguishable from a resin prepared from recrystallized chlorendic acid.

*Example 7.—Polyester preparation—propylene glycol azeotrope of partial ester*

An adduct was prepared by reacting 1.1 mole hexachlorocyclopentadiene with 1.0 mole maleic anhydride at 150° centigrade for a period of 4.5 hours, at which time the mixture was slushy. To this was added 2.0 moles propylene glycol while the mixture was stirred until a clear solution was obtained. This was distilled under a pressure of 6 millimeters of mercury until almost no distillate was formed below 150° centigrade. Then 1.0 mole more propylene glycol was added and the azeotropic distillation continued until 127.5 grams distillate had been obtained of which 39.5 grams was chlorocarbons. At the end of the distillation the distillate titrated less than 1 percent chlorocarbon by precipitometric analysis. Half of the remaining product was transferred to a resin kettle along with 261 grams propylene glycol and 160 grams maleic anhydride. Esterification was carried out at 170 millimeters of mercury until the water of reaction had been largely removed, at which the pressure was reduced to 7 millimeters for 4.5 hours while the reaction temperature climbed slowly to a maximum of 170° centigrade, at which point the resin was dumped under a blanket of carbon dioxide. The product had a Gardner color of five, acid number of thirty, hydroxyl 0.55 meq./gram, and was found very suitable for the preparation of polyester molding compounds.

*Example 8.—Polyester preparation—diethylene glycol azeotrope of partial ester*

To 1.1 mole commercial hexachlorocyclopentadiene at 150° centigrade in a glass balloon flask was added with stirring 1.0 mole maleic anhydride over a period of 0.5 hour. The reaction was then allowed to proceed at 150° centigrade and with stirring for 4.5 hours after which 0.5 mole diethylene glycol was added. The temperature temporarily rose to 170° centigrade before returning to the 150° centigrade bath temperature. Then vacuum distillation was carried out at 7 millimeters of mercury for thirty minutes while 17 milliliters chlorocarbons were distilled azeotropically along with about 10 milliliters diethylene glycol. Then 0.5 mole more diethylene glycol was added and the azeotropic distillation continued with glycol distillate being decanted and returned to still pot until distillate contained less than 1% chlorocarbon.

The glycol chlorendate prepared above was resinified as follows: 221 grams diethylene glycol was added to the mixture along with 160 grams maleic anhydride and the mixture resinified at 165° centigrade to 170° centigrade for four hours at one atmosphere pressure. Then the pressure was reduced to less than 5 millimeters of mercury and the esterification continued for four more hours, after which the resin was dumped into carbon dioxide blanketed trays. There was obtained a clear polyester resin, color eight Gardner, carboxyl value 0.1 meq./gram, hydroxyl value 1.1 meq./gram, which had no odor of hexachlorocyclopentadiene or other chlorocarbons, was non-irritating and non-corrosive to metal equipment.

*Example 9.—Polyester preparation—water azeotrope of partial ester*

An adduct was prepared in a stainless steel resin kettle by reacting 1.138 mole maleic anhydride with 0.433 mole hexachlorocyclopentadiene at 145° centigrade to 155° centigrade for a total of 2.25 hours. A resin was prepared from this crude adduct after first performing an azeotropic distillation with water to remove chlorocarbon residues from a half ester of the adduct as follows. The adduct (1.1 mole of anhydride), 1.47 moles of ethylene glycol, 0.21 mole of diethylene glycol, 0.58 mole of fumaric acid, and 1.39 moles of water were combined in a glass resin flask and heated to 90° centigrade under agitation until the adduct had dissolved. After thirty minutes the system was evacuated to 200 millimeters and distilled as the pot temperature was gradually raised to 153° centigrade in 3.5 hours. During this distillation an azeotrope of water and residual chlorocarbons distilled over from which 4.9 grams residual chlorocarbons were recovered. This mixed chlorocarbon sample contained no more than 0.2 gram hexachlorocyclopentadiene by spectrophotometric analysis. This distillation was followed by resinification at temperatures up to 162° centigrade at 2 millimeters of mercury pressure for 3.75 hours, after which the resin was discharged into a carbon dioxide blanketed tray. There was obtained a 98 percent yield of a thermosetting polyester resin having a Gardner color of eight, acid number of forty-three. This resin contained no measurable amount of hexachlorocyclopentadiene or other chlorocarbons and had no objectionable odor or corrosive effect on metal equipment.

*Example 10.—Azeotropic purification during esterification—glycerol and water*

An adduct was prepared in the usual way by reacting 0.66 mole maleic anhydride with 0.60 mole commercial hexachlorocyclopentadiene at 150° centigrade for about eight hours. At this time the adduct analyzed spectrophotometrically for 0.45 weight percent hexachlorocyclopentadiene.

A small stainless steel resin kettle was charged with 6192 grams of this adduct along with 1658 grams of glycerol. This mixture was agitated as the temperature was gradually raised to 160° centigrade in sixty-eight minutes. When a homogeneous liquid solution had been formed, the system was gradually evacuated until a pressure of 12 millimeters to 14 millimeters of mercury was reached, and the temperature was held at 159° centigrade plus or minus 1.5° centigrade during this time. There was obtained 283 grams of distillate consisting of 49 grams chlorocarbons, 225 grams of water, and 9 grams glycerol. The resin was discharged at 38,000 centipoises viscosity into trays and blanketed with carbon dioxide until cool. The product had a color of four to five Gardner units, acid number of 56.7, and hydroxyl value of 3.293 meq./gram. The yield was 95%.

*Example 11.—Azetropic purification during esterification—glycerol and water*

An adduct was prepared in the usual way with 6.0 moles freshly distilled hexachlorocyclopentadiene and 7.19 moles maleic anhydride by reaction at 145° centigrade for 8.5 hours. Then to this adduct were added 2.46 moles fumaric acid, 2.70 moles adipic acid, 0.99 mole diethylene glycol and 11.69 moles ethylene glycol. These were combined in a five-liter glass balloon flask and heated at atmospheric pressure until 60 percent of the water of esterification had been distilled off. At this time the pressure was slowly reduced and resinification was carried out at 160° centigrade and 8 millimeters of mercury until the acid number of the resin fell below nineteen at which time the resin was discharged. When the acid number had reached thirty-seven, 0.39 gram of p-toluhydroquinone was added as a polymerization inhibitor. The resulting solid polyester resin had a Gardner color of eight, acid number of 1.6, hydroxyl value of 0.27 meq./gram. This solid resin was dissolved in styrene at the rate of 40 grams of styrene per hundred of resin to yield a liquid laminating-type polyester resin equivalent to a resin prepared from recrystallized chlorendic acid. This liquid resin had a color of six Gardner and when hardened with a peroxide catalyst yielded thermoset plastic materials having no detectable chlorocarbon content, no irritating effect on the skin, and no corrosive effect on metals.

*Example 12.—Azeotropic purification during esterification—glycerol and water during mixed alkyd preparation*

An adduct was prepared from 2.0 moles of hexachlorocyclopentadiene and 2.0 moles of maleic anhydride by reacting for a period of about five hours at 150° centigrade. To this was added under reflux 1.5 moles of allyl alcohol at a temperature of 140° centigrade to 160° centigrade. After a clear solution was obtained in 0.5 hour of stirring, 0.8 mole of glycerol was then added and the system immediately vacuum distilled at a pressure less than 2 millimeters. Under these conditions the residual chlorocarbons azeotroped from the system along with a little of the glycerol and water of esterification. Dilution of this distillate with water allowed the recovery of about 8 grams of residual chlorocarbon mixture. The resinification was completed by stirring the system under vacuum while slowly raising the temperature to 180° centigrade. When the resin becomes too viscous to stir well, it may be discharged into a carbon dioxide blanketed tray. In this way there was obtained a brittle molding compound-type mixed polyester resin with a color of eight Gardner, acid number of fifty-five, hydroxyl value 0.46 meq./gram. The product is a powderable solid which will cure with peroxide catalysts to cross-linked products. The product had no residual chlorocarbon odor and had no deleterious act on the skin or corrosive act on metal equipment.

*Example 13.—Azeotropic purification during esterification—trimethylolpropane and water*

An adduct was prepared from 7.0 moles of hexachlorocyclopentadiene and 7.0 moles of maleic anhydride by reacting for a period of about two hours at about 165° centigrade. Fifty-eight grams of monochlorobenzene was added during the adduction period. Then 14 moles of trimethylolpropane was added as a solid and the system was vacuum distilled at about 5 millimeters pressure until the product had an acid number in the range of 50 to 60. The temperature under vacuum gradually increased to about 160° centigrade. The distillate comprised 127.6 grams of an oil phase containing 60.4 percent chlorine due largely to the presence of hexachlorocyclopentadiene, 67.3 grams of water phase which analyzed 1.5 percent chlorine, and a solid phase which was largely trimethylolpropane with entrained oil phase as indicated by a chlorine analysis of 34.2 percent. No more than a trace of chlorendic anhydride was distilled overhead.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. In a process for preparing a Diels-Alder adduct wherein hexahalocyclopentadiene is reacted with maleic anhydride, the improvement for recovering said Diels-Alder adduct from the halocarbon impurities in the crude product of the reaction, which comprises adding to the mixture a material which will form a constant minimum boiling mixture with the halocarbon impurities and selected from the group consisting of maleic anhydride, water, an aliphatic monohydric alcohol, an aliphatic dihydric alcohol, and aliphatic polyhydric alcohol, and mixtures thereof, distilling said constant minimum boiling mixture, and recovering purified Diels-Alder adduct.

2. In a process for preparing a Diels-Alder adduct wherein hexachlorocyclopentadiene is reacted with maleic anhydride, the improvement for recovering said Diels-Alder adduct from the chlorocarbon impurities in the crude product of the reaction, which comprises adding to the mixture a material which will form a constant minimum boiling mixture with the chlorocarbon impurities, and selected from the group consisting of maleic anhydride, water, an aliphatic monohydric alcohol, an aliphatic dihydric alcohol, an aliphatic polyhydric alcohol and mixtures thereof, distilling said constant minimum boiling mixture, and recovering purified Diels-Alder adduct.

3. A process according to claim 2 wherein the material which will form a constant minimum boiling mixture is maleic anhydride.

4. A process according to claim 3 wherein the maleic anhydride portion of the distillate is returned to the process cycle in a continuous process.

5. A process according to claim 3 wherein the distillation is carried out at a pressure of below two hundred millimeters mercury.

6. In a process for preparing an ester of chlorendic anhydride wherein hexachlorocyclopentadiene is reacted with maleic anhydride and the resulting chlorendic anhydride reacted with a material selected from the group consisting of an aliphatic monohydric alcohol, and aliphatic dihydric alcohol, an aliphatic polyhydric alcohol and mixtures thereof, the improvement for recovering said ester from the chlorocarbon impurities in the crude product of the aforementioned reactions, which comprises distilling the crude product in the presence of a material which will form a constant minimum boiling mixture with the chlorocarbon impurities and selected from the group consisting of maleic anhydride, water, an aliphatic monohydric alcohol, an aliphatic dihydric alcohol, an aliphatic polyhydric alcohol and mixtures thereof, and recovering a purified ester of chlorendic anhydride.

7. A process according to claim 6 wherein the material which will form a constant minimum boiling mixture with the chlorocarbon impurities is trimethylol propane.

8. A process according to claim 6 wherein the material which will form a constant minimum boiling mixture with the chlorocarbon impurities is ethylene glycol.

9. A process according to claim 6 wherein the material which will form a constant minimum boiling mixture with the chlorocarbon impurities is diethylene glycol.

10. A process according to claim 6 wherein the material which will form a constant minimum boiling mixture with the chlorocarbon impurities is propylene glycol.

11. A process according to claim 6 wherein the material which will form a constant minimum boiling mixture with the chlorocarbon impurities is glycerol.

12. A process according to claim 6 wherein the distillation is carried out at a pressure of below two hundred millimeters mercury.

13. A process according to claim 5 wherein the distillation is carried out at a temperature below one hundred and seventy degrees centigrade.

14. A process according to claim 12 wherein the distillation is carried out at a temperature below one hundred and seventy degrees centigrade.

No references cited.

NICHOLAS S. RIZZO, *Primary Examiner.*